(12) United States Patent
Ohler et al.

(10) Patent No.: US 10,098,502 B2
(45) Date of Patent: Oct. 16, 2018

(54) GRILL AND WOOD-CHARCOAL CHAMBER

(71) Applicant: LotusGrill GmbH, Limburgerhof (DE)

(72) Inventors: Hans Ohler, Limburgerhof (DE); Mischa Ohler, Speyer (DE); Harri Paakkanen, Heidelberg (DE)

(73) Assignee: LotusGrill GmbH, Limburgerhof (DE)

( * ) Notice: Subject to any disclaimer, the term of this patent is extended or adjusted under 35 U.S.C. 154(b) by 0 days.

(21) Appl. No.: 15/321,381

(22) PCT Filed: Apr. 27, 2015

(86) PCT No.: PCT/DE2015/200280
§ 371 (c)(1),
(2) Date: Dec. 22, 2016

(87) PCT Pub. No.: WO2016/008478
PCT Pub. Date: Jan. 21, 2016

(65) Prior Publication Data
US 2017/0224159 A1    Aug. 10, 2017

(30) Foreign Application Priority Data
Jul. 15, 2014 (DE) .................. 10 2014 213 770

(51) Int. Cl.
*A47J 37/07* (2006.01)
(52) U.S. Cl.
CPC .................. *A47J 37/0704* (2013.01)
(58) Field of Classification Search
CPC .................................................. A47J 37/079
See application file for complete search history.

(56) References Cited

U.S. PATENT DOCUMENTS 1,102,649 A * 7/1914 Dix .................. F24B 1/205
126/29
1,212,162 A * 1/1917 Green ................ A47J 37/0763
126/30
(Continued)

FOREIGN PATENT DOCUMENTS

DE    202014001383 U1    5/2014
EP       1838187 B1    9/2010
(Continued)

OTHER PUBLICATIONS

International Searching Authority, International Search Report (ISR) and Written Opinion for International Application No. PCT/DE2015/200280, dated Aug. 31, 2015, 10 pages, Netherlands.
(Continued)

*Primary Examiner* — Avinash Savani
*Assistant Examiner* — Martha Becton
(74) *Attorney, Agent, or Firm* — Alston & Bird LLP

(57) ABSTRACT

A grill, comprising a housing (1), a carrier shell (2) arranged inside the housing (1) at a distance from the housing (1) on all sides, a substantially cylindrical wood-charcoal chamber (20), which stands in the carrier shell (2) and has a cover (24), a grill grate (3) arranged above the wood-charcoal chamber (20), and an air supply device, which produces an air flow directed into the wood-charcoal chamber (20) from below the carrier shell (2), is characterized in that the cylindrical wall (23) of the wood-charcoal chamber (20) is produced from a stainless-steel sheet and in that the stainless-steel sheet is slotted, perforated, or stretched.

20 Claims, 12 Drawing Sheets

(56) References Cited

U.S. PATENT DOCUMENTS

| | | | | |
|---|---|---|---|---|
| 1,238,142 A * | 8/1917 | Hitchcock | F24B 1/205 | 126/29 |
| 1,279,033 A * | 9/1918 | Stollberg | F23G 5/42 | 110/259 |
| 2,061,336 A * | 11/1936 | Stuart | F24B 1/205 | 126/25 R |
| 2,161,669 A * | 6/1939 | Freeman | A47J 37/0704 | 126/25 R |
| 2,164,835 A * | 7/1939 | Pearson | F24B 1/205 | 126/25 R |
| 2,408,935 A * | 10/1946 | Kunst | F24B 13/02 | 126/14 |
| 2,424,665 A * | 7/1947 | Pope, Sr. | F24B 1/205 | 110/241 |
| 2,467,480 A * | 4/1949 | Hudson | A47J 37/07 | 126/30 |
| 2,469,885 A * | 5/1949 | Molla | F24B 1/205 | 126/151 |
| 2,488,014 A * | 11/1949 | Higman | F24B 1/202 | 126/15 R |
| 2,575,082 A | 11/1951 | Wolff | | |
| 2,607,334 A * | 8/1952 | Perlman | A47J 36/24 | 126/25 R |
| 2,627,263 A * | 2/1953 | Anderson | F24C 5/20 | 126/38 |
| 2,939,773 A * | 6/1960 | Rymer | A47J 37/079 | 126/15 R |
| 2,965,097 A * | 12/1960 | Clark, Jr. | A47J 37/06 | 126/30 |
| 3,062,200 A * | 11/1962 | Miller | A47J 37/079 | 126/25 B |
| 3,073,263 A * | 1/1963 | Wynkoop | A47J 37/079 | 126/163 R |
| 3,123,062 A * | 3/1964 | Psarris | A47J 37/079 | 126/25 B |
| 3,139,880 A * | 7/1964 | Sangeorge | A47J 37/079 | 126/25 C |
| 3,146,773 A * | 9/1964 | Melzer | A47J 37/0763 | 126/9 R |
| 3,177,826 A * | 4/1965 | Cohen | A47J 37/079 | 126/25 B |
| 3,209,712 A * | 10/1965 | Arena | A47J 37/079 | 126/162 |
| 3,209,743 A * | 10/1965 | Stewart | A47J 37/079 | 126/243 |
| 3,323,443 A * | 6/1967 | Schulze | A47J 37/0763 | 126/25 R |
| 3,327,697 A * | 6/1967 | Berlant | A47J 37/0754 | 126/25 R |
| 3,331,365 A * | 7/1967 | Sussan | A47J 37/0763 | 126/25 R |
| 3,384,066 A * | 5/1968 | Tufts | A47J 37/079 | 126/9 R |
| 3,413,935 A * | 12/1968 | Behrns | A47J 37/079 | 126/25 B |
| 3,453,975 A * | 7/1969 | Gunter | A47J 37/079 | 126/25 B |
| 3,581,731 A * | 6/1971 | Schulze | A47J 37/0763 | 126/25 R |
| 3,667,446 A * | 6/1972 | Morton | A47J 37/07 | 126/25 C |
| 3,791,368 A * | 2/1974 | Hunt | A47J 37/0713 | 126/25 A |
| 3,848,577 A * | 11/1974 | Storandt | A47J 37/079 | 126/25 B |
| 3,868,943 A * | 3/1975 | Hottenroth | A47J 37/0754 | 126/25 R |
| 3,884,214 A * | 5/1975 | Duncan | A47J 37/079 | 126/25 B |
| 3,974,821 A * | 8/1976 | Storandt | A47J 37/079 | 126/25 B |
| 3,982,522 A * | 9/1976 | Hottenroth | F24B 1/202 | 126/146 |
| 4,106,486 A * | 8/1978 | Lee | A47J 27/04 | 126/369 |
| 4,130,103 A * | 12/1978 | Zimmerman | A47J 37/079 | 126/25 B |
| 4,211,206 A * | 7/1980 | Darbo | A47J 37/0763 | 126/25 R |
| D258,259 S * | 2/1981 | Lindholm | D7/332 | |
| 4,368,727 A * | 1/1983 | Higgins | A47J 36/26 | 126/25 C |
| 4,394,410 A * | 7/1983 | Osrow | A47J 36/022 | 428/43 |
| 4,413,609 A * | 11/1983 | Tisdale | A47J 37/0763 | 126/25 R |
| 4,417,565 A * | 11/1983 | Karpinia | F23Q 13/04 | 126/25 B |
| D273,264 S * | 4/1984 | Elliston | D7/332 | |
| 4,469,083 A * | 9/1984 | Helle | F24B 5/026 | 126/200 |
| 4,532,910 A * | 8/1985 | Longley, Jr. | F24B 1/205 | 126/29 |
| 4,567,876 A * | 2/1986 | Ogden | A47J 37/07 | 126/25 B |
| 4,569,327 A * | 2/1986 | Velten | A47J 37/0763 | 126/25 A |
| 4,624,238 A * | 11/1986 | Hait | F24B 1/205 | 126/25 R |
| 4,763,639 A * | 8/1988 | Goldsworthy | A47J 37/0704 | 126/25 R |
| 4,794,906 A * | 1/1989 | Longley, Jr. | F24C 1/16 | 126/38 |
| 4,877,010 A * | 10/1989 | Hait | F24C 1/16 | 126/39 M |
| 4,909,235 A * | 3/1990 | Boetcker | A47J 37/0704 | 126/25 C |
| 4,915,091 A * | 4/1990 | Varney | F24B 1/202 | 126/29 |
| 4,969,449 A * | 11/1990 | Levin | A47J 37/0786 | 126/221 |
| 4,971,045 A * | 11/1990 | Probst | F24B 1/205 | 126/29 |
| 5,086,752 A * | 2/1992 | Hait | F24C 1/16 | 126/25 R |
| 5,094,223 A * | 3/1992 | Gonzalez | F24B 15/005 | 126/25 B |
| 5,168,860 A * | 12/1992 | Kibourian | A47J 37/0754 | 126/15 A |
| 5,197,455 A * | 3/1993 | Tessien | A47J 37/079 | 126/144 |
| 5,404,864 A * | 4/1995 | Kent, Jr. | A47J 37/0763 | 126/25 B |
| 5,425,352 A * | 6/1995 | Gillam | A47J 37/0763 | 126/25 R |
| 5,711,210 A * | 1/1998 | Kaufman | A47J 27/10 | 126/9 R |
| 5,785,046 A * | 7/1998 | Colla | F24B 1/202 | 126/151 |
| D420,441 S * | 2/2000 | Hall | D23/402 | |
| 6,076,515 A * | 6/2000 | Smith | C10L 11/00 | 126/146 |
| 6,314,955 B1 * | 11/2001 | Boetcker | A47J 36/2477 | 126/25 R |
| D476,403 S * | 6/2003 | Goodrich | D23/332 | |
| 6,708,604 B1 * | 3/2004 | Deichler, Jr. | A47J 37/0763 | 126/25 R |
| 6,823,858 B1 * | 11/2004 | Chen | F24C 1/16 | 126/25 R |
| 6,845,769 B2 * | 1/2005 | Chen | F24B 1/022 | 126/25 R |
| 7,188,617 B1 * | 3/2007 | O'Blenes | F24C 3/14 | 126/24 |
| 7,637,258 B2 * | 12/2009 | Cosgrove | A47J 37/0754 | 126/25 R |
| D612,190 S * | 3/2010 | Tenney | D7/332 | |

(56) References Cited

U.S. PATENT DOCUMENTS

| | | | |
|---|---|---|---|
| 8,245,634 B1* | 8/2012 | Maiaro | C25D 11/04 428/137 |
| D728,308 S * | 5/2015 | Barford | D7/402 |
| D734,974 S * | 7/2015 | Barford | D7/332 |
| 9,420,913 B2* | 8/2016 | DeSpain | F24C 1/16 |
| 9,657,950 B2* | 5/2017 | Boucher | A47J 37/0763 |
| 2002/0023548 A1* | 2/2002 | Almeida | A47J 37/0786 99/450 |
| 2004/0020482 A1* | 2/2004 | Chen | F24B 1/022 126/9 R |
| 2005/0121020 A1* | 6/2005 | McLemore | A47J 37/0704 126/25 R |
| 2006/0225724 A1* | 10/2006 | Turner | F24B 1/202 126/9 R |
| 2006/0249139 A1* | 11/2006 | Alongi | A47J 37/079 126/30 |
| 2007/0006863 A1* | 1/2007 | Barbarich | A47J 37/0763 126/9 R |
| 2008/0121117 A1* | 5/2008 | Best | A47J 37/0635 99/339 |
| 2008/0230043 A1* | 9/2008 | Bruno | A47J 37/079 126/25 B |
| 2009/0056695 A1* | 3/2009 | Cosgrove | A47J 37/0754 126/25 R |
| 2009/0148801 A1 | 6/2009 | Wedermann | |
| 2009/0205629 A1* | 8/2009 | Yamamoto | A47J 37/0704 126/25 R |
| 2010/0116262 A1* | 5/2010 | Voges | A47J 37/04 126/25 R |
| 2011/0073098 A1* | 3/2011 | Chang | A47J 37/0704 126/25 B |
| 2012/0073559 A1* | 3/2012 | Mize | F24B 15/005 126/25 B |
| 2012/0192852 A1* | 8/2012 | Whitmire | F04D 25/06 126/25 B |
| 2013/0042852 A1* | 2/2013 | Cottrell | F23Q 13/04 126/25 B |
| 2013/0340740 A1* | 12/2013 | Schaefer | A47J 37/079 126/25 B |
| 2014/0026766 A1* | 1/2014 | Goff, IV | A47J 37/07 99/445 |
| 2014/0326720 A1* | 11/2014 | Probst | F24C 1/16 220/6 |

FOREIGN PATENT DOCUMENTS

| | | |
|---|---|---|
| GB | 2168474 A | 6/1986 |
| KR | 101226468 B1 | 1/2013 |
| WO | WO 2014/094745 A1 | 6/2014 |

OTHER PUBLICATIONS

The International Bureau of WIPO, International Preliminary Report on Patentability (English translation of ISA's Written Opinion) for International Application No. PCT/DE2015/200280, dated Jan. 17, 2017, 7 pages, Switzerland.

* cited by examiner

GRILL AND WOOD-CHARCOAL CHAMBER

CROSS REFERENCE TO RELATED APPLICATIONS

This application is a national stage application, filed under 35 U.S.C. § 371, of International Application No. PCT/DE2015/200280, filed Apr. 27, 2015, which claims priority to German Application No. 10 2014 213 770.5, filed Jul. 15, 2014, the contents of both of which as are hereby incorporated by reference in their entirety.

BACKGROUND

Technical Field

The invention relates to a grill with a housing, a carrier shell, which is arranged inside the housing at a distance from the housing on all sides; an essentially cylindrical charcoal chamber, which is located in the carrier shell and has a lid; a grill grate, which is arranged above the charcoal chamber; and an air supply device, which generates air flow, directed into the charcoal chamber, from below the carrier shell. Furthermore, the invention relates to a charcoal chamber, in particular, for use in a grill of the invention.

Description of Related Art

According to the generic features, the invention is a charcoal grill that is particularly suitable as a table grill due to its special design and components. Solely for the purpose of giving an example of such a grill reference is made to the European patent EP 1 838 187 B1.

For the known charcoal grill it is essential that it has a charcoal chamber inside a housing for the glowing charcoal, where in this case the charcoal chamber is provided with a screen-like covering. The charcoal shell is provided with a closed wall and is supplied with combustion air from below by means of a central, conical bulge and a perforation arranged therein.

The charcoal chamber, known from the prior art, is problematic on many counts. Said charcoal chamber lends itself primarily to radiating heat upwards, i.e., through a covering flame screen. Due to the shell-shaped design of the charcoal chamber, it reflects the radiant heat more or less upwards, so that the effective area is significantly reduced. In addition, the flame screen threatens to break or, more specifically, to become brittle due to the filigree design, in particular, after several heat cycles.

BRIEF SUMMARY

Based on the aforesaid, the object of the present invention is to design and further develop the generic grill in such a way that it can be handled without danger and at the same time is extremely simple in design. The objective is to design the charcoal chamber in such a way that it is stable, so that it can withstand constant use even at high temperatures inside the chamber. At the same time the chamber should radiate sufficient heat without hardly any restriction at all. The aforementioned engineering object is achieved by means of the features disclosed in patent claim 1, according to which the generic grill is characterized by the feature that the cylindrical wall of the charcoal chamber is made of a high-grade steel plate and that the high-grade steel plate is slotted, perforated or stretched.

It has been found in accordance with the present invention that a cylindrically designed charcoal chamber is particularly suitable, since, on the one hand, it radiates the heat upwards and, on the other hand, radiates the heat simultaneously through its wall to one side. In a particularly advantageous manner the cylindrical wall of the charcoal chamber is made of a high-grade steel plate, where in this case this high-grade steel plate may be slotted, perforated or stretched in order to promote omni-directional radiation.

In an advantageous way the wall of the charcoal chamber has axially extending slots, which are formed preferably parallel to each other and which extend between a continuous bottom-sided edge of the chamber and a continuous lid-sided edge of the chamber. It is also conceivable that the slots deviate from the axial orientation and extend, for example, at an angle obliquely to the axis. In any case the essential aspect is that the slots are designed just so wide that it is sufficient for optimum radiation of heat, while at the same time they have to be so narrow that neither embers nor sparks can pass through the slots to the external environment.

As an alternative, it is conceivable that the wall consists of a plurality of wall elements or, more specifically, wall segments, which are arranged so as to be offset from each other and, as a result, form the wall of the charcoal chamber. In this context the wall elements can overlap each other at least slightly, so that an axially extending slot or, more precisely, a kind of partial annular surface is formed between each of the overlapping wall elements. Depending on the degree of the overlap, it is possible to effectively prevent the embers and/or sparks from passing to the external environment.

The slots may be formed in accordance with the requirement, where in this case a slot width in the range of 1 mm to 3 mm is advantageous.

According to another alternative, the wall of the charcoal chamber is designed as an expanded metal mesh, i.e., made of expanded metal. The mesh length, mesh width and stretch width may also be in the range of 1 mm to 3 mm. The material thickness may be between 0.1 mm and 2 mm. The use of commercially available expanded metal in accordance with the above elucidation is conceivable.

In the context of another preferred alternative, the wall is designed as a perforated plate, where in this case the perforated plate may have a round, an oval or, more specifically, an elliptical or oblong perforation, a rectangular, preferably a square perforation, or a polygonal, preferably a hexagonal perforation. The perforation of adjacent rows of holes can lie on a horizontal line or can be arranged so as to be offset from each other.

The holes may vary widely in their design and have a diameter or, more specifically, a width in the range of 1 mm to 3 mm, preferably in the range of 2 mm.

The slots, perforations, etc. are made preferably by punching. In this case the wall of the charcoal chamber is bent in such a way that the protuberances resulting from punching face inwards and, in so doing, form small edges that once again prevent the sparks from passing to the external environment.

The lid closes off the charcoal chamber upwards. The upward radiation of heat is supported, in particular, by the fact that the surface of the removable lid is also perforated, with the perforations being made just large enough that radiant heat can pass freely through the perforation, but the embers remain inside the charcoal chamber, even in the case that the grill is improperly tilted or even falls over. In that respect it must be ensured that the removable lid is fixed in its charcoal-chamber-closing position, i.e., placed on the top edge of the charcoal chamber, by mechanical means.

In an advantageous embodiment the perforation of the lid has preferably identical passages, for example, with a diameter in the range of 3 mm to 9 mm, preferably with a diameter of 6 mm. This measure allows a sufficiently large amount of radiant heat to exit upwards, but the undesired exit of the glowing constituents of the charcoal is effectively prevented, even in the event that the entire grill with the charcoal chamber is tilted.

In a particularly advantageous manner the perforation comprises at least two groups of holes that are arranged in the shape of a circular ring, with the circular rings, which are formed in this way, being disposed coaxially to each other.

The lid may comprise at least two areas with different axial spacing from the edge of the lid, where in this case the different areas are assigned the respective group of holes. Correspondingly there is a group of holes on each level of the lid, where in this case the holes or rather the passages may be formed equidistant from each other.

In the specific case the lid can have downwards angled or, more specifically, inclined transition areas between the areas and possibly in its edge region, so that any grease dripping onto the lid can run along said transition areas downwards towards the side. The result is that an effective barrier is created with respect to preventing the grease from being burned. Additional measures with respect to this aspect will be explained below.

The lid is designed and dimensioned in such a way that it overlaps or, more specifically, encloses with its edge region the charcoal chamber in its upper region. The lid may be a kind of slip-on lid, where in this case the lid can be pressed or forced onto the upper edge region of the charcoal chamber. Even a snap lock would be conceivable in the case of a bead-like configuration of the upper edge region of the charcoal chamber and in the case of a corresponding configuration of the overlapping edge of the lid.

In a particularly advantageous manner the lid comprises an upper clamping bracket, which is also used preferably as a handle and which has at least a certain degree of elasticity. Said clamping bracket is used for clamping and securing the closed charcoal chamber between the bottom region of the carrier shell and the grill grate. In other words, the charcoal chamber is secured by placing or, more specifically, securing the grill grate, with the result that the clamping bracket has a clamping function. This measure allows the charcoal chamber to be secured in the closed state, so that the glowing charcoal cannot fall out unintentionally, even if the entire grill is tipped over. A high degree of safety is achieved.

In order to promote once more the efficiency of the charcoal chamber that is used as a combustion chamber, the bottom of the charcoal chamber is perforated, so that said charcoal chamber can be fired from below by means of a kindling aid and, upon firing up, can draw. Even this perforation may comprise at least two groups of holes that are arranged, similar to the lid, in the shape of a circular ring. The circular rings, which are formed in such a way, are also arranged coaxially to each other. Owing to this measure the charcoal chamber also lends itself to lighting the charcoal in an ideal way, especially since it is possible to light the charcoal chamber from below by means of a kindling aid. In any event the perforation in the bottom region of the charcoal chamber is used, on the one hand, to ignite the charcoal contained in the chamber charcoal and, on the other hand, to supply air to the interior of the charcoal chamber.

With respect to the design it is advantageous for the charcoal chamber if the bottom is displaced at least slightly inwards with respect to the free edge that projects beyond the bottom and if the edge terminates with a circumferential, outwardly projecting flange, a projection, etc. Owing to this measure the charcoal chamber does not end up, for example, with the bottom region directly on an underlay, but rather with the free edge on the underlay, and, in particular, so as to form at the same time a space, which is used as the kindling space, between the underlay and the bottom region.

In order to stabilize body that forms the charcoal chamber, the lower and/or the upper edge of the charcoal chamber is/are reinforced by folding, flanging, etc. It is also conceivable that the edge regions comprise a reinforced metal edge that is molded on.

The wall of the charcoal chamber should also be just as suitable for sufficiently good radiation of heat. For this purpose the wall is designed as a circumferential, preferably fine mesh screen, so that omni-directional radiant heat is possible without hardly any restriction at all. The screen should be a high quality screen made of a high-grade steel that is suitable for sufficiently long use.

With respect to the charcoal chamber it should be noted in summary that this charcoal chamber has a circumferential screen wall in a particularly advantageous fashion, where in this case the bottom region projects with the circumferential screen wall inwards into the charcoal chamber and defines downwards a space. In addition, the bottom region of the charcoal chamber is perforated, so that a kindling aid, arranged underneath, can act into the charcoal chamber. In addition, the air flow into the charcoal chamber is supported.

The same is true with respect to the lid, which may securely close the charcoal chamber, but the perforation, provided therein, allows the heat to radiate almost freely upwards in an ideal way. The sum of all of these measures with respect to the charcoal chamber supports the efficiency.

As already stated above, the charcoal chamber is placed on an underlay, which is advantageously a kindling tray, on which the charcoal chamber stands with its lower edge. The space between the bottom of the kindling tray and the inwardly offset bottom of the charcoal chamber is used for loading a preferably paste-like kindling aid that is ignited in the inserted state of the kindling tray in the carrier shell. Thereupon the charcoal chamber is placed on or rather in the kindling tray, where it is secured in accordance with the clamping described above.

In order to position the kindling tray in the best possible way, said kindling tray comprises at least three downwardly projecting support feet, with which said kindling tray stands on the bottom of the carrier shell. Other positioning mechanisms can be implemented.

In order to promote or, more specifically, to ensure suitable air flow, the bottom region of the kindling tray, preferably in the center, is provided with an air inlet for introducing the air coming from the air supply device. The air inlet projects into the kindling tray preferably by means of a flange, an edge or the like, which projects upwards from the bottom region, so that a paste-like kindling aid is effectively prevented from sliding off of said kindling tray in the direction of the air supply device.

The lower region of the housing is provided advantageously with an inner bottom, which may be welded into the housing. The air supply device may comprise an air inlet pipe, which extends from below the inner bottom through the said inner bottom or, integrally formed with said inner bottom, extends through the carrier shell and through the bottom of the kindling aid into the region of the kindling aid. The carrier shell and the kindling tray may be slid or placed on the air inlet pipe, so that the air inlet pipe is used simultaneously to clearly position the carrier shell and the kindling tray.

A fan or, more specifically, a blower can be arranged below the inner bottom, near the inlet of the air inlet pipe.

The fan blows air in a controlled manner into the air inlet pipe, as required or rather as a function of the setting.

The fan is a miniaturized unit with extremely low power consumption, similar or identical to the fan in the housing of a computer. In addition, the fan runs almost noiselessly.

A control unit for operating the fan is provided in a particularly advantageous manner. This control unit regulates the fan down on reaching an operating temperature that is detectable preferably above the grill grate.

A switch, a controller and a battery compartment with at least one battery or an accumulator for supplying power to the blower may be disposed below the inner bottom of the housing. The switch and the controller are located advantageously in the wall of the housing, in order to actuate from the outside. The battery compartment is accessible from outside the housing, preferably from below the housing, through a flap that is provided there.

In order to support the air flow over the kindling tray into the charcoal chamber, the housing has openings in the region beneath the inner bottom. These openings, which are used to feed in air, are preferably in the form of decorative passages, for example, in the form of slot-like openings. When the fan is suitably positioned, air is drawn in from outside the housing and blown into the air inlet or, more specifically, into the air inlet pipe up into the charcoal chamber. The air inlet may be part of or, more specifically, an integrated component of the fan housing.

It is also conceivable that the housing has openings in the region above the inner bottom; and these openings, which are used for cooling in the region between the housing and the carrier shell, are preferably in the form of decorative passages or, more specifically, slots over the entire circumference of the housing, so that the outer wall of the housing is temperature-decoupled as far as possible from the charcoal chamber, i.e., on the one hand, due to the interpositioning of the carrier shell, which reflects the heat from inside, and, on the other hand, due to the air space between the carrier shell and the housing. It is also conceivable that the inner bottom is designed so as to be perforated, slotted or otherwise continuous, so that air can also be drawn or blown by means of the fan into the region between the carrier shell and the housing and can flow from the interspace into the region under the inner bottom and from there through the air inlet pipe into the charcoal chamber. This measure also supports the cooling and, thus, an undesired heat transfer to the housing.

With respect to the grill grate and, in particular, with respect to its secure positioning, it is advantageous if said grill grate has plug-in feet, which are used for plugging into openings in the upper edge of the carrier shell or in the housing, so that a secure attachment of the grill grate on the housing is possible. The grill grate itself may have a circumferential guard rail in its edge region, at least slightly above the actual grill area, so that this measure effectively prevents the grilled food from falling off. Thus, another safety measure is provided.

With respect to securing the grill grate in position, it is advantageous if said grill grate can be secured in such a way that it is clamped on the edge of the housing, preferably by means of clamping means, which are preferably made of metal. The clamping means may be clamps or the like, so that it is possible to secure the grill grate in position. As already stated above, when clamping the grill grate, it has a clamping effect on the lid of the charcoal chamber, so that the charcoal chamber is effectively secured between the carrier shell and the grill grate.

In an additional advantageous manner the grill grate has a central closed, preferably corrugated grill area. This grill area in turn can have an outwards sloping drip edge or at least a drip nose, the diameter of which is at least slightly larger than the diameter of the charcoal chamber. In the end, when the grill area is arranged centrally on or rather in the grill grate, the closed grill area will project beyond the charcoal chamber, which is also arranged centrally below said grill grate, so that this measure prevents at least as far as possible the grease from dripping onto the lid of the charcoal chamber. As a result, the dripping grease will fall on the sides next to the charcoal chamber and can run together in the carrier shell.

In order to support the collecting of the dripping grease, the carrier shell is suspended in the housing preferably with an edge region that is at least partially circumferential. In this case the bottom region of the carrier shell slopes down to an outer edge region, where it forms a collecting region for dripping grease. When the carrier shell is made of a high-grade steel, the carrier shell can be easily removed from the housing and can be cleaned, as well as the other components of the grill, in a dishwasher.

Even the housing may be made primarily of metal, where in this case the bottom region beneath the inner bottom may also be easily made of plastic. Both regions can be pressed together, bolted, glued or joined together in some other way.

It is also possible to surface finish the metallic housing at least on the outside by means of powder coating or, more specifically, with a powder coated paint finish. Any color scheme is conceivable.

Furthermore, it is advantageous to make the carrier shell and/or the charcoal chamber (in total) and/or the kindling tray and/or the grill grate of a high-grade steel, in order to achieve, in particular, a long service life and for the purpose of easy cleaning, if possible, in a dishwasher.

The coordinated patent claims provided herein relate not only to a grill but also to a charcoal chamber itself that comprises any of the features relating to the charcoal chamber disclosed in any of the claims provided herein directed additionally to the grill. At this point an elucidation will not be necessary in this respect and with reference to the elucidation with respect to the grill, which has a corresponding charcoal chamber.

BRIEF DESCRIPTION OF THE FIGURES

At this point there are a number of ways of embodying and further developing the teaching of the present invention in an advantageous fashion. On the one hand, reference is made to the claims provided herein and, on the other hand, to the following explanation of preferred embodiments of the invention based on the drawings. In conjunction with the explanation of the preferred exemplary embodiments of the invention with reference to the drawings, generally preferred embodiments and further developments of the teaching are also explained. In the drawings FIG. 11 shows the exemplary embodiment of the inventive charcoal chamber according to FIG. 10, with the lid put on.

DETAILED DESCRIPTION OF VARIOUS EMBODIMENTS

Figure 1:
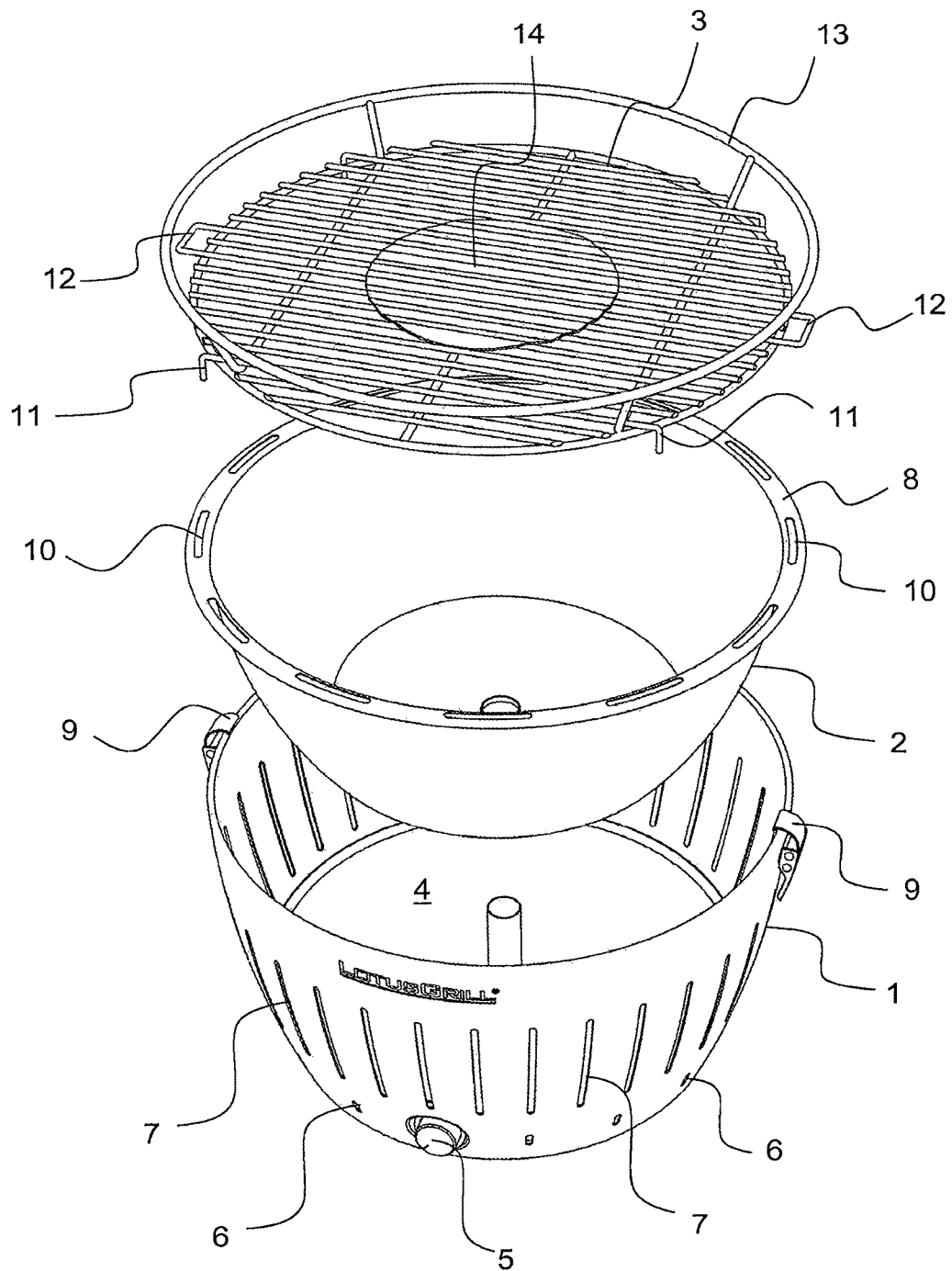
FIG. 1 shows in schematic form an exploded view of the essential "outer" components of the grill according to the invention.

FIG. 1 shows in schematic form an exploded view of the "outer" components of the inventive grill, that is, starting from the bottom, the housing 1; the carrier shell 2, which can be inserted into the housing 1; and the grill grate 3, which can be disposed above said carrier shell.

Furthermore, it can be seen in FIG. 1 that the housing 1 has an inner bottom 4 in the sense of an intermediate bottom in the lower region, and below the inner bottom there are the electrical components. From outside the housing 1 a rotary knob 5 can be seen; and this knob is used for switching on and off as well as for controlling a blower that is disposed underneath the inner bottom 4.

The wall of the housing 1 is provided with lower passages 6, which are used to draw in outside air. The upper passages 7 are used for venting the space between the carrier shell 2 and the housing 1.

The carrier shell 2 is placed with its edge region 8 on the free edge of the housing 1, where it is secured by means of a clamping device 9, which act on the grill grate 3. Ultimately the clamping device 9 constitutes clamps that act on both sides and that connect the grill grate 3 and, thus, the carrier shell 2 firmly to the housing 1.

The edge region 8 of the carrier shell 2 is provided with recesses 10 that are used to position the insertion of the feet 11 of the grill grate 3. This measure allows the grill grate 3 to be positioned in an ideal manner, where in this case the clamping devices 9 or, more specifically, the clamping clips, which are provided there, engage in the side fastening brackets 12 on the grill grate 3. By tensioning the clamping devices 9 the grill grate 3 is firmly connected to the housing 1 and, in particular, with the interpositioning of the carrier shell 2, which is equally fixed at the same time. In the assembled position, a heat-insulating air space, which is ventilated by means of the upper passages 7, is created between the housing 1 and the carrier shell 2.

The grill grate 3 comprises a circumferential guard rail 13 and is provided centrally with a closed, corrugated grill area 14, the edge region of which may be formed so as to slope at least slightly downwards, so that the grease can dip off.

Figure 2:
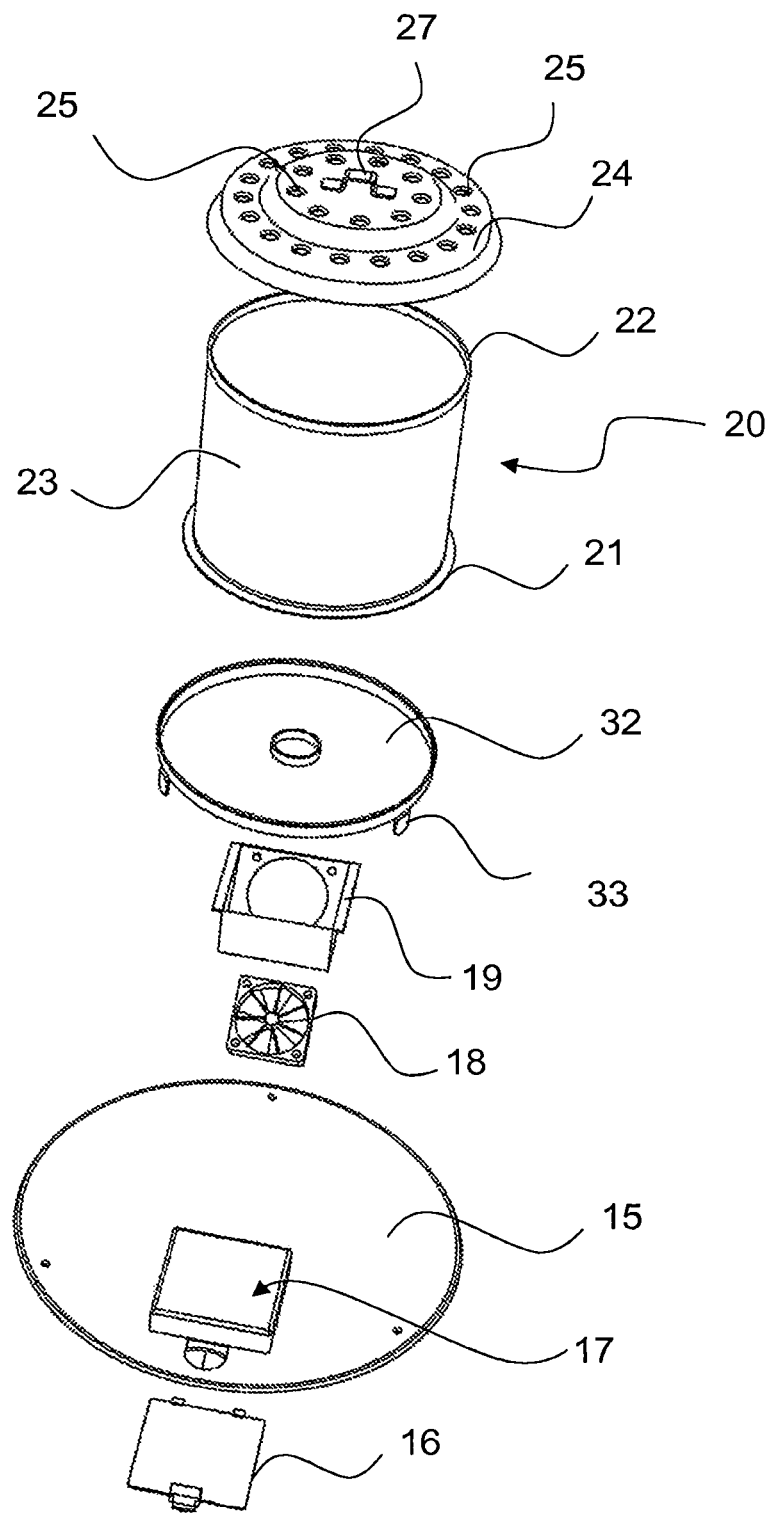
FIG. 2 shows in schematic form an exploded view of the essential "inner" components of the grill according to the invention.

FIG. 2 shows in schematic form an exploded view of the essential "inner" components of the inventive grill, that is, starting from the bottom, a bottom 15, which closes off the housing 1 downwards and which is provided with an opening flap 16 for insertion and removal of the batteries 17. The batteries 17 are used to supply power to a fan 18, which is disposed in a fan housing 19.

Furthermore, FIG. 2 shows the charcoal chamber 20, which is provided, according to the invention, inside the grill and which has a lower flanged edge region 21 and an upper reinforced edge region 22. Between them there extends a special wall 23, which is designed as a fine-mesh screen made of a high-grade steel.

The charcoal chamber 20 is provided with a lid 24, which has two plane-parallel areas at a varying axial distance from the edge of the lid. Groups of holes 25 are formed concentric to each other in the areas. In addition, the lid 24 is provided with slanted or rather sloping surfaces in the transition between the areas, comprising the groups of holes 25, and in the edge region, both of which are used for the grease to run off or, more specifically, to drip off.

Furthermore, the lid 24 is provided with a handle 27, which is used as a clamping bracket in the assembled state of the grill, i.e., for clamping the closed charcoal chamber 20 securely between the bottom region of the carrier shell 2 and the grill grate 3.

The kindling tray will be discussed in greater detail below.

Figure 3:
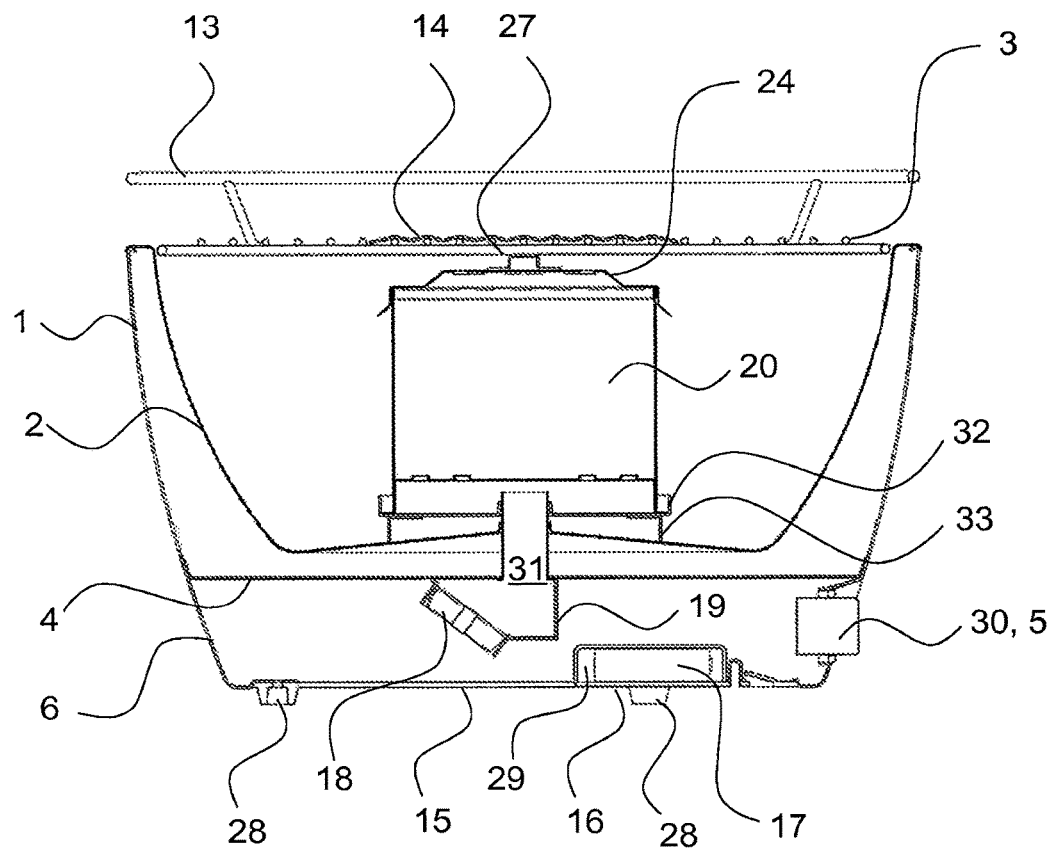
FIG. 3 shows in schematic form a side view, cut and partially broken away, of the inventive grill with the essential components in the assembled state.

FIG. 3 shows the inventive grill in an assembled view, in a sectional view, with the charcoal chamber 20 disposed therein.

Starting from the bottom, the housing 1 is closed by means of the bottom 15, where in this case feet 28 are provided for positioning the housing 1 or rather the grill. The bottom 15 is bolted or latched, but at any rate can be removed from or, more specifically, taken off of the housing 1.

The opening flap 16, through which a battery compartment 29 can be opened, is provided in the bottom 15. The batteries 17 are located inside the battery compartment 29.

The power supply of the fan 18 is provided by the batteries 17, where in this case a switch or, more specifically, a controller 30 is interposed; and this controller has a rotary knob 5 that is used as a switch. In principle, the speed of the fan 18 is manually adjustable.

Furthermore, FIG. 3 shows that the fan 18 is disposed inside a fan housing 19, as a result of which the air, which flows through the lower passages 6 into the housing 1, is conveyed into an air inlet pipe 31. The air inlet pipe 31 or, more specifically, the air inlet, which is formed in such a way, extends through the inner bottom 4, through a central passage in the carrier shell 2, into a space below the charcoal chamber 20, which stands in a kindling tray 32, namely, with feet 33, which are molded on, on the bottom region of the carrier shell 2. Air that is drawn in or rather blown through the air inlet pipe 31 is used to supply combustion air to a kindling aid, which may be found in the kindling tray 32 and which is made preferably of a paste-like material. Correspondingly the charcoal, contained in the charcoal chamber 20, is ignited by means of the heat generated in the kindling tray 32, supported by the air supply, so that a rapid kindling of the charcoal that lies above can be achieved.

According to the drawing shown in FIG. 3, the charcoal chamber 20 is closed with the lid 24, which sits in the sense of a slip-on lock on the charcoal chamber 20. The charcoal chamber 20 is secured between the carrier shell 2 and the grill grate 3 by means of the resiliently acting handle 27, so that in the assembled state a secure arrangement of the charcoal chamber 20, in the closed state, is guaranteed.

The grill grate 3 is arranged with a circumferential guard rail 13 as the top closure, where in this case the grill grate 3 has a closed grill area 14 in the central region.

Figure 4:
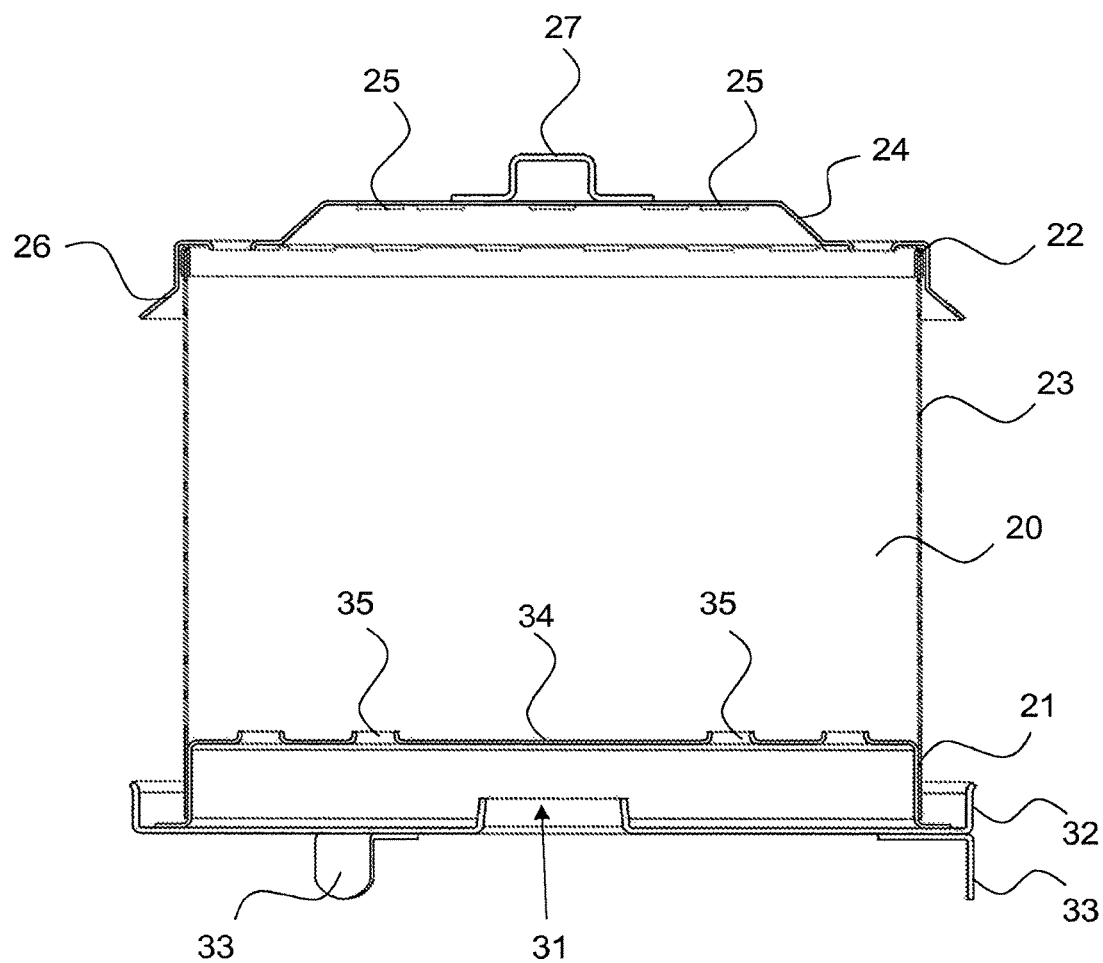
FIG. 4 shows in schematic form a side view, cut, of the basic design of the charcoal chamber of the grill according to the invention.

FIG. 4 shows the charcoal chamber 20 in detail, according to which said charcoal chamber has a flanged lower edge region 21 with a perforated bottom 34. Passages or, more specifically, groups of holes 35 are formed in the bottom 34. The passages or, more specifically, the groups of holes 35 in the bottom 34 are used to better fire the charcoal from below, i.e., to fire by means of the kindling aid, which in the assembled state may be found underneath in the kindling tray 32 (see FIG. 3).

The wall 23 of the charcoal chamber 20 has passages, which will be discussed later. Towards the top the wall 23 is closed off by a metal-reinforced, preferably flanged edge region 22.

Figure 5:
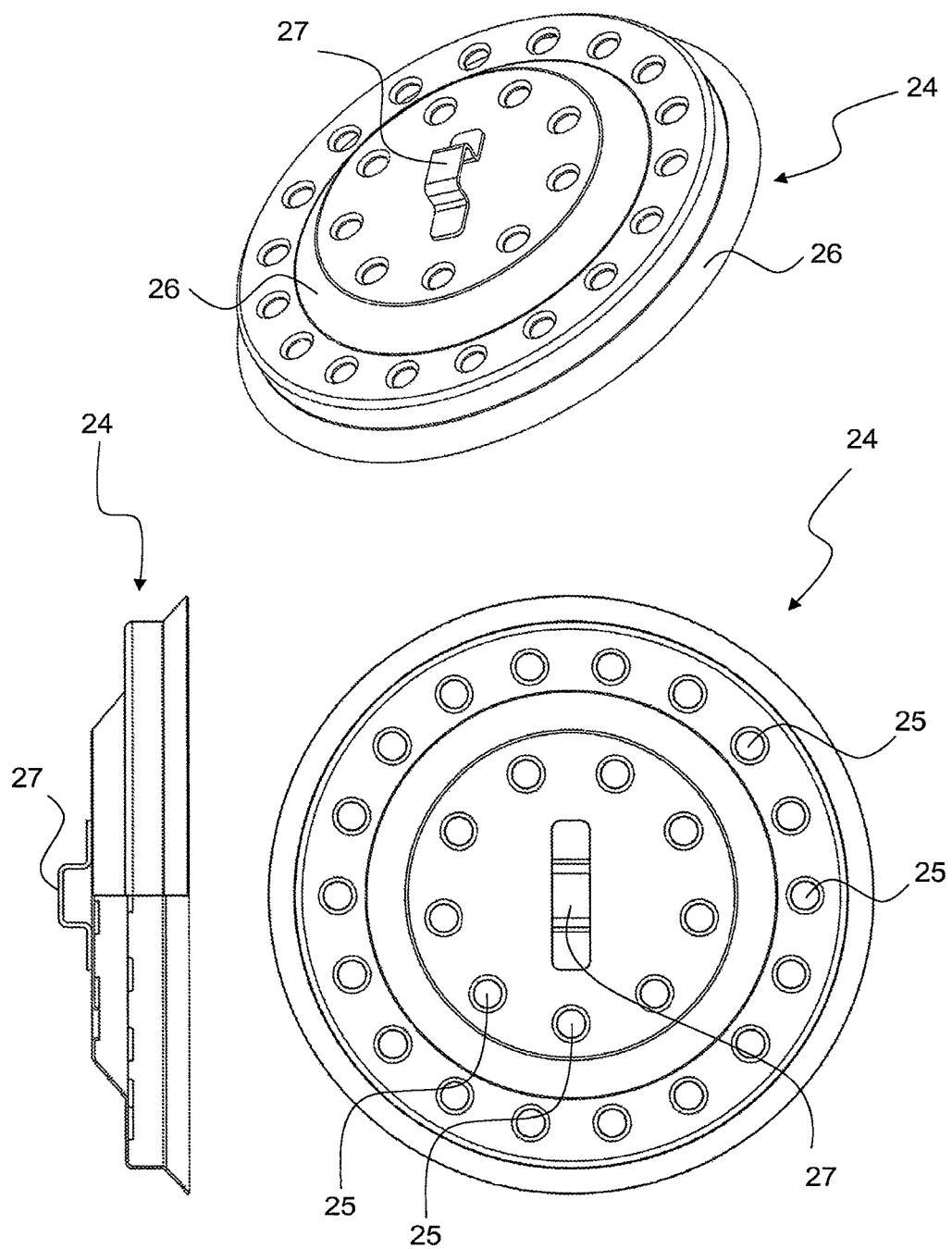
FIG. 5 shows a schematic view, plan view and side view of an exemplary embodiment of the lid for closing the charcoal chamber according to FIG. 4.

FIG. 5 shows the lid 24, with which the charcoal chamber 20 can be closed in the sense of a slip-on lock. The groups of holes 25 are assigned to different areas of the lid 24, where in this case a sloping surface as well as an outer sloping edge 26 are provided between the areas. The central handle 27 is used, on the one hand, for handling and, on the other hand, for clamping with respect to the grill grate 3. Even the lid 24 is made preferably of a high-grade steel.

Figure 6:
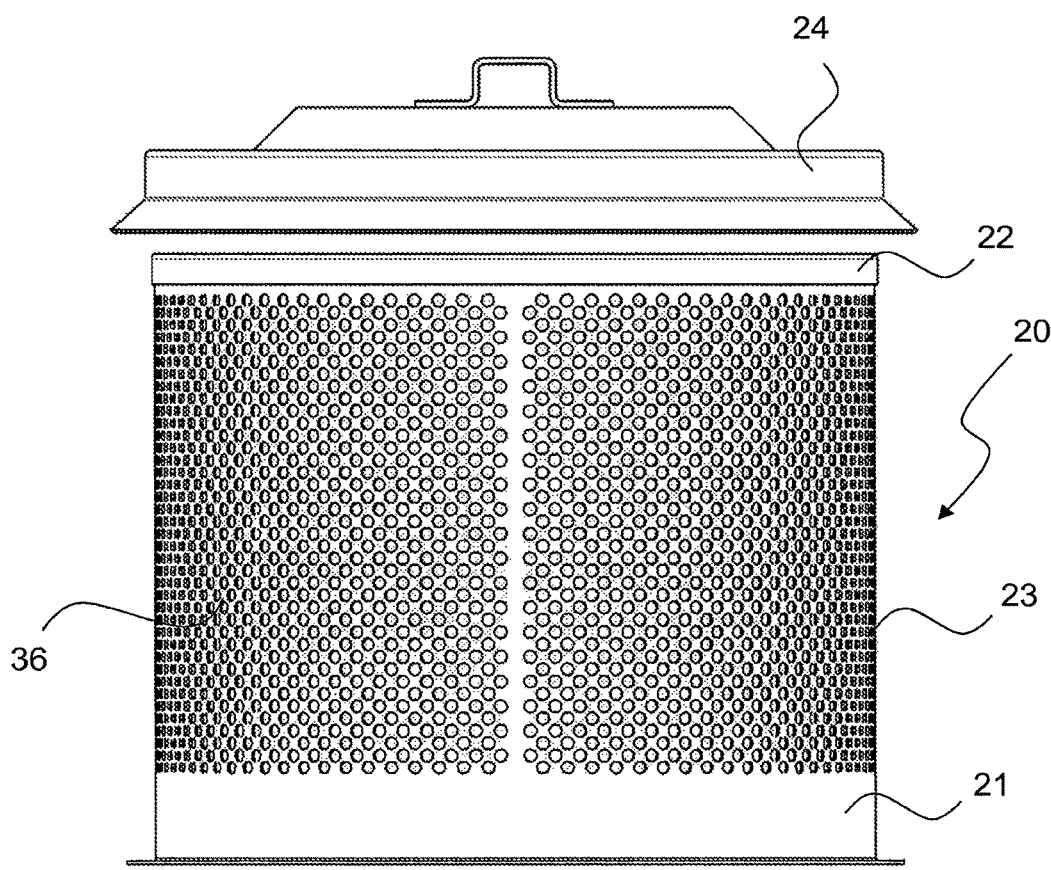
FIG. 6 shows a first exemplary embodiment of the inventive charcoal chamber, made of a perforated plate with a round perforation, with the lid raised.
Figure 7:
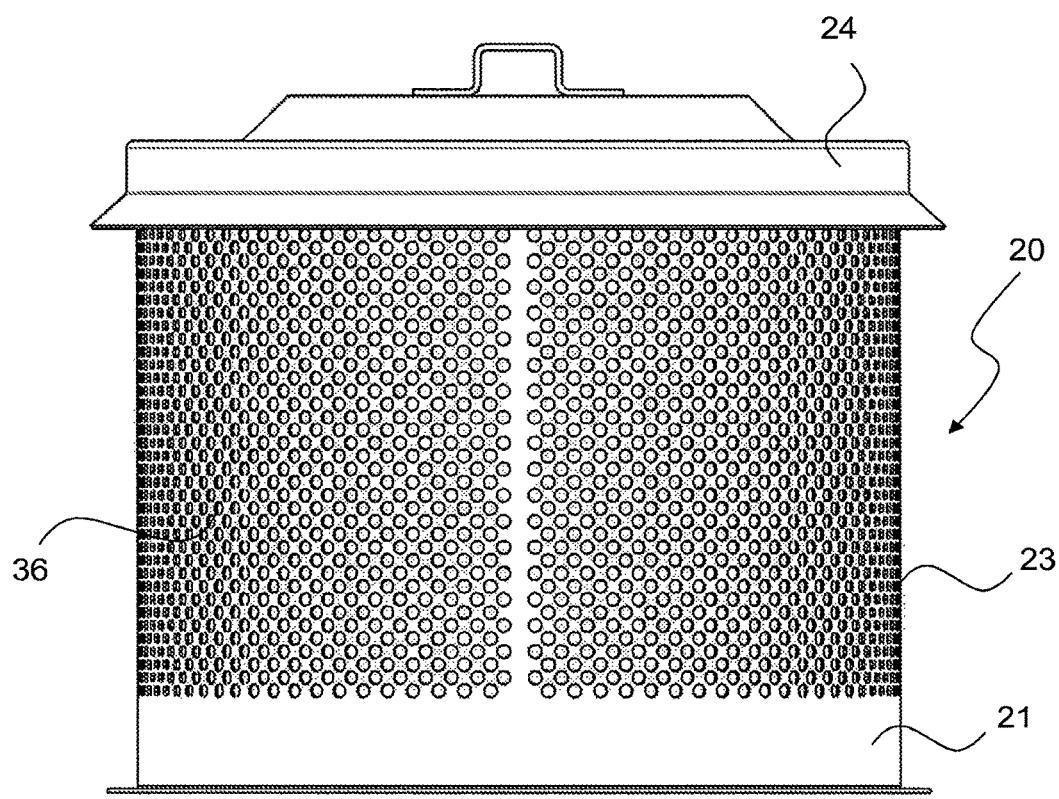
FIG. 7 shows the exemplary embodiment of the inventive charcoal chamber according to FIG. 6, with the lid put on, FIG. 8 shows a second exemplary embodiment of the inventive charcoal chamber made of a perforated plate with a square perforation, with the lid raised.

FIGS. 6 and 7 show a first exemplary embodiment of a charcoal chamber 20 of the invention, where the wall 23 is made of a punched perforated plate with round perforation 36. The lower edge region 21 does not have any perforation and, as a result, contributes to the stability of the charcoal chamber 20. Even the upper edge region 22 is reinforced by a fold. Even this edge region 22 contributes to the stability of the charcoal chamber 20.

While the drawing in FIG. 6 shows that the lid 24 is lifted, it sits, according to FIG. 7, on the charcoal chamber 20. In addition to a simple slip-on connection, it is also possible to provide a latching connection, a bayonet connection, etc. in order to securely close the charcoal chamber 20.

Figure 8:
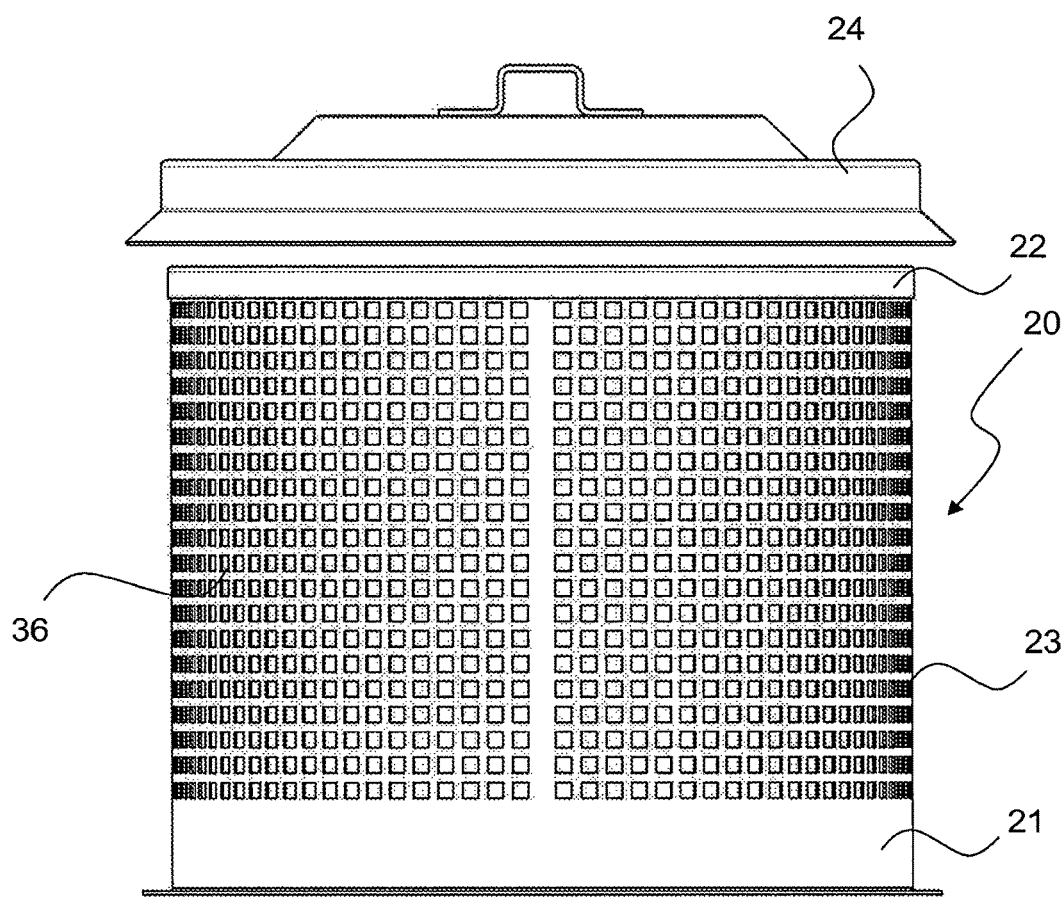
Figure 9:
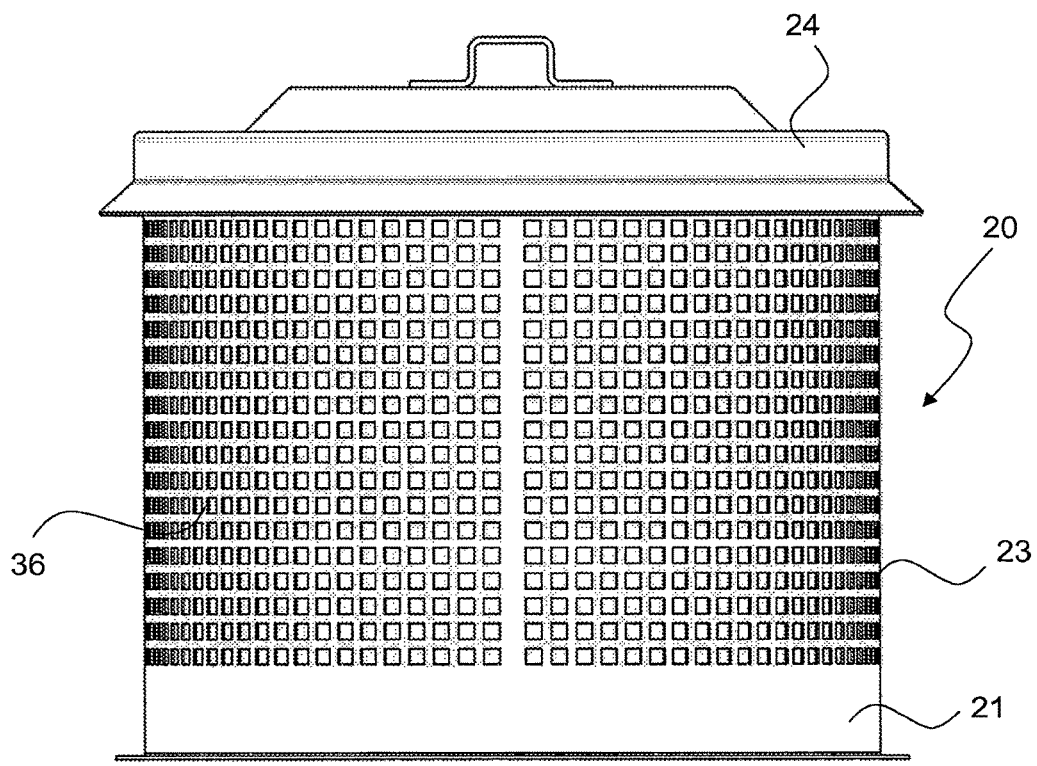
FIG. 9 shows the exemplary embodiment of the inventive charcoal chamber according to FIG. 8, with the lid put on, FIG. 10 shows a third exemplary embodiment of the inventive charcoal chamber, made of a perforated plate with an elongated perforation, with the lid raised.

FIGS. 8 and 9 show another exemplary embodiment of the charcoal chamber 20 of the invention, where in this case a square perforation 36 is provided in the wall 23 of the charcoal chamber 20. Otherwise, this exemplary embodiment corresponds to the exemplary embodiment from FIGS. 6 and 7.

Figure 10:
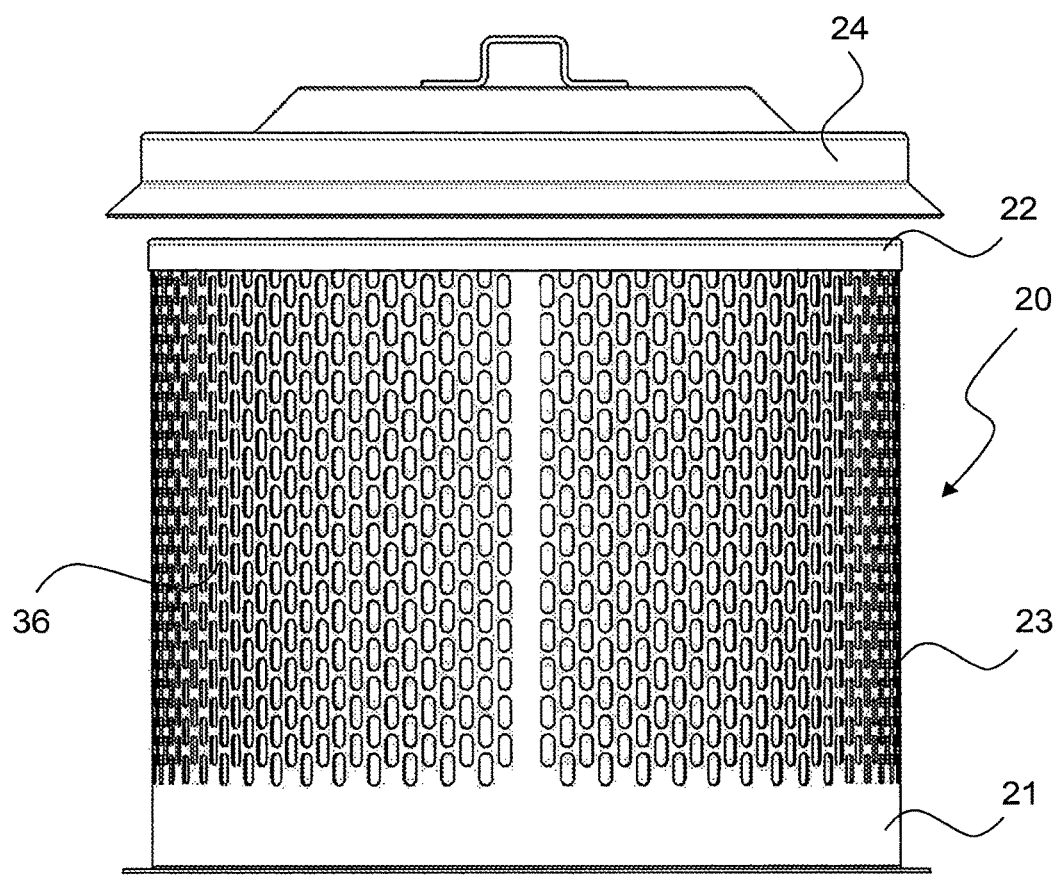
Figure 11:
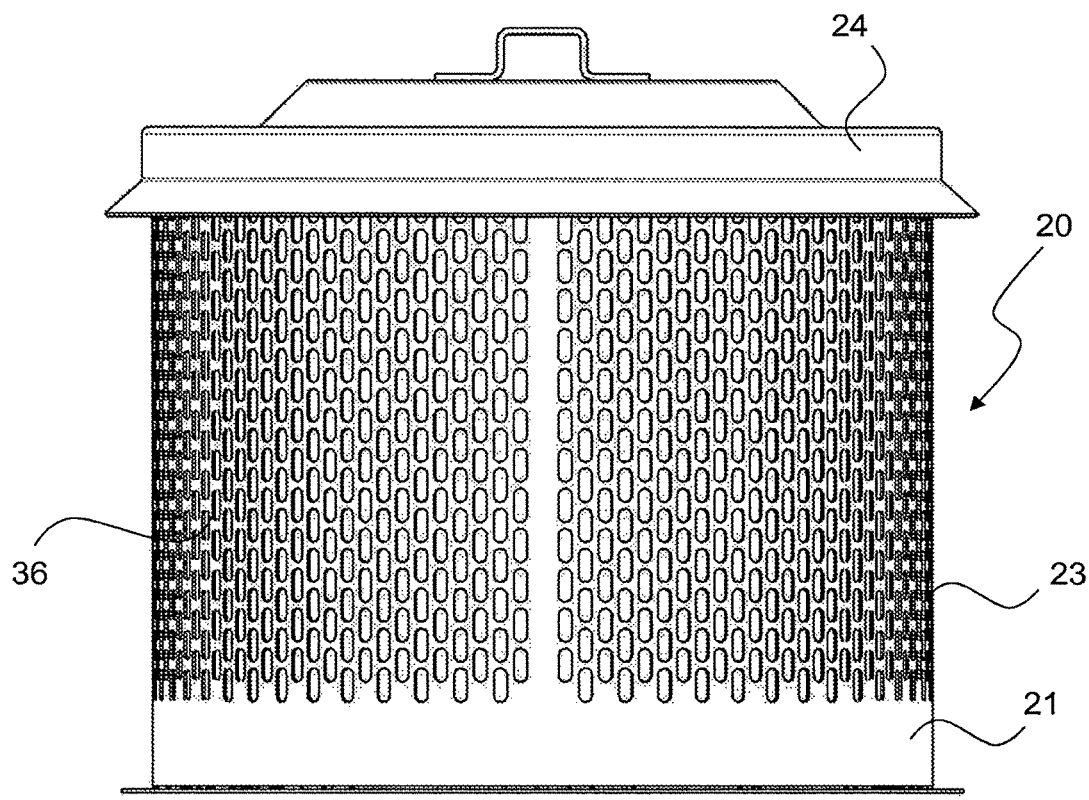

According to the additional embodiment of a charcoal chamber 20 shown in FIGS. 10 and 11, the perforation 36 is designed so as to be elongated or, more precisely, in the form of elongated slots. An elliptical configuration could be provided accordingly.

Figure 12:
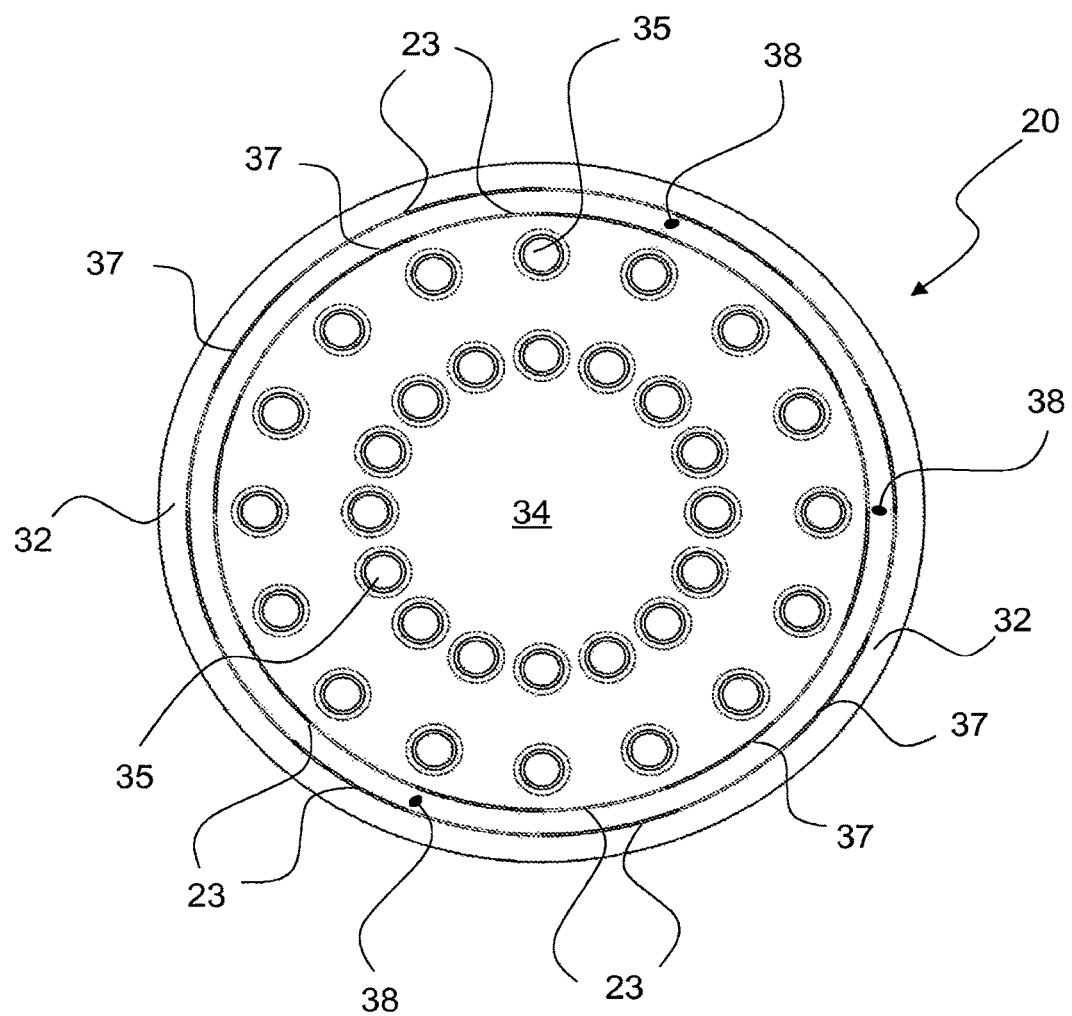
FIG. 12 shows in schematic form a plan view of an additional exemplary embodiment of an inventive charcoal chamber, in which the staggered wall elements form the circumferential wall with side slots.

FIG. 12 shows in schematic form a plan view of another special embodiment of a charcoal chamber 20 of the invention, where in this case this representation, viewed from above, shows the bottom 34 of the charcoal chamber 20 and the respective group of holes 35.

The wall 23 consists of staggered wall elements 37, which owing to their offset form vertical gaps 38 for promoting the radiation of heat. The gaps 38 are designed in such a way that neither embers nor sparks can escape to the outside environment.

FIG. 12 shows that the wall elements 37, which form the wall 23, stand in the kindling tray 32, where in this case the wall elements 37 can be made of nested high-grade steel tubes with corresponding notches or, more specifically, recesses. In any case the essential aspect is that the wall elements 37 complement each other in an overlapping manner and, as a result, form the gap 38 between each of the wall elements 37.

At this point it should be noted that it is possible to provide an inlet, which is not shown in the figures and which may consist of a close-meshed steel net or screen, in order to continue to keep, in particular, the embers in the interior of the charcoal chamber 20.

With respect to other advantageous embodiments of the inventive grill, it has been found in accordance with the present invention that a cylindrically designed charcoal chamber is particularly suitable, since, on the one hand, it radiates the heat upwards and, on the other hand, radiates the heat simultaneously through its wall to one side. In a particularly advantageous manner the cylindrical wall of the charcoal chamber is made of a high-grade steel plate, where in this case this high-grade steel plate may be slotted, perforated or stretched in order to promote omni-directional radiation.

In an advantageous way the wall of the charcoal chamber has axially extending slots, which are formed preferably parallel to each other and which extend between a continuous bottom-sided edge of the chamber and a continuous lid-sided edge of the chamber. It is also conceivable that the slots deviate from the axial orientation and extend, for example, at an angle obliquely to the axis. In any case the essential aspect is that the slots are designed just so wide that it is sufficient for optimum radiation of heat, while at the same time they have to be so narrow that neither embers nor sparks can pass through the slots to the external environment.

As an alternative, it is conceivable that the wall consists of a plurality of wall elements or, more specifically, wall segments, which are arranged so as to be offset from each other and, as a result, form the wall of the charcoal chamber. In this context the wall elements can overlap each other at least slightly, so that an axially extending slot or, more precisely, a kind of partial annular surface is formed between each of the overlapping wall elements. Depending on the degree of the overlap, it is possible to effectively prevent the embers and/or sparks from passing to the external environment.

The slots may be formed in accordance with the requirement, where in this case a slot width in the range of 1 mm to 3 mm is advantageous.

According to another alternative, the wall of the charcoal chamber is designed as an expanded metal mesh, i.e., made of expanded metal. The mesh length, mesh width and stretch width may also be in the range of 1 mm to 3 mm. The material thickness may be between 0.1 mm and 2 mm. The use of commercially available expanded metal in accordance with the above elucidation is conceivable.

In the context of another preferred alternative, the wall is designed as a perforated plate, where in this case the perforated plate may have a round, an oval or, more specifically, an elliptical or oblong perforation, a rectangular, preferably a square perforation, or a polygonal, preferably a hexagonal perforation. The perforation of adjacent rows of holes can lie on a horizontal line or can be arranged so as to be offset from each other.

The holes may vary widely in their design and have a diameter or, more specifically, a width in the range of 1 mm to 3 mm, preferably in the range of 2 mm.

The slots, perforations, etc. are made preferably by punching. In this case the wall of the charcoal chamber is bent in such a way that the protuberances resulting from punching face inwards and, in so doing, form small edges that once again prevent the sparks from passing to the external environment.

The lid closes off the charcoal chamber upwards. The upward radiation of heat is supported, in particular, by the fact that the surface of the removable lid is also perforated, with the perforations being made just large enough that radiant heat can pass freely through the perforation, but the embers remain inside the charcoal chamber, even in the case that the grill is improperly tilted or even falls over. In that respect it must be ensured that the removable lid is fixed in its charcoal-chamber-closing position, i.e., placed on the top edge of the charcoal chamber, by mechanical means.

In an advantageous embodiment the perforation of the lid has preferably identical passages, for example, with a diameter in the range of 3 mm to 9 mm, preferably with a diameter of 6 mm. This measure allows a sufficiently large amount of radiant heat to exit upwards, but the undesired exit of the glowing constituents of the charcoal is effectively prevented, even in the event that the entire grill with the charcoal chamber is tilted.

In a particularly advantageous manner the perforation comprises at least two groups of holes that are arranged in the shape of a circular ring, with the circular rings, which are formed in this way, being disposed coaxially to each other.

The lid may comprise at least two areas with different axial spacing from the edge of the lid, where in this case the different areas are assigned the respective group of holes. Correspondingly there is a group of holes on each level of the lid, where in this case the holes or rather the passages may be formed equidistant from each other.

In the specific case the lid can have downwards angled or, more specifically, inclined transition areas between the areas and possibly in its edge region, so that any grease dripping onto the lid can run along said transition areas downwards towards the side. The result is that an effective barrier is created with respect to preventing the grease from being burned. Additional measures with respect to this aspect will be explained below.

The lid is designed and dimensioned in such a way that it overlaps or, more specifically, encloses with its edge region the charcoal chamber in its upper region. The lid may be a kind of slip-on lid, where in this case the lid can be pressed or forced onto the upper edge region of the charcoal chamber. Even a snap lock would be conceivable in the case of a bead-like configuration of the upper edge region of the charcoal chamber and in the case of a corresponding configuration of the overlapping edge of the lid.

In a particularly advantageous manner the lid comprises an upper clamping bracket, which is also used preferably as a handle and which has at least a certain degree of elasticity. Said clamping bracket is used for clamping and securing the closed charcoal chamber between the bottom region of the carrier shell and the grill grate. In other words, the charcoal chamber is secured by placing or, more specifically, securing the grill grate, with the result that the clamping bracket has a clamping function. This measure allows the charcoal chamber to be secured in the closed state, so that the glowing charcoal cannot fall out unintentionally, even if the entire grill is tipped over. A high degree of safety is achieved.

In order to promote once more the efficiency of the charcoal chamber that is used as a combustion chamber, the bottom of the charcoal chamber is perforated, so that said charcoal chamber can be fired from below by means of a kindling aid and, upon firing up, can draw. Even this perforation may comprise at least two groups of holes that are arranged, similar to the lid, in the shape of a circular ring.

The circular rings, which are formed in such a way, are also arranged coaxially to each other. Owing to this measure the charcoal chamber also lends itself to lighting the charcoal in an ideal way, especially since it is possible to light the charcoal chamber from below by means of a kindling aid. In any event the perforation in the bottom region of the charcoal chamber is used, on the one hand, to ignite the charcoal contained in the chamber charcoal and, on the other hand, to supply air to the interior of the charcoal chamber.

With respect to the design it is advantageous for the charcoal chamber if the bottom is displaced at least slightly inwards with respect to the free edge that projects beyond the bottom and if the edge terminates with a circumferential, outwardly projecting flange, a projection, etc. Owing to this measure the charcoal chamber does not end up, for example, with the bottom region directly on an underlay, but rather with the free edge on the underlay, and, in particular, so as to form at the same time a space, which is used as the kindling space, between the underlay and the bottom region.

In order to stabilize body that forms the charcoal chamber, the lower and/or the upper edge of the charcoal chamber is/are reinforced by folding, flanging, etc. It is also conceivable that the edge regions comprise a reinforced metal edge that is molded on.

The wall of the charcoal chamber should also be just as suitable for sufficiently good radiation of heat. For this purpose the wall is designed as a circumferential, preferably fine mesh screen, so that omni-directional radiant heat is possible without hardly any restriction at all. The screen should be a high quality screen made of a high-grade steel that is suitable for sufficiently long use.

With respect to the charcoal chamber it should be noted in summary that this charcoal chamber has a circumferential screen wall in a particularly advantageous fashion, where in this case the bottom region projects with the circumferential screen wall inwards into the charcoal chamber and defines downwards a space. In addition, the bottom region of the charcoal chamber is perforated, so that a kindling aid, arranged underneath, can act into the charcoal chamber. In addition, the air flow into the charcoal chamber is supported.

The same is true with respect to the lid, which may securely close the charcoal chamber, but the perforation, provided therein, allows the heat to radiate almost freely upwards in an ideal way. The sum of all of these measures with respect to the charcoal chamber supports the efficiency.

As already stated above, the charcoal chamber is placed on an underlay, which is advantageously a kindling tray, on which the charcoal chamber stands with its lower edge. The space between the bottom of the kindling tray and the inwardly offset bottom of the charcoal chamber is used for loading a preferably paste-like kindling aid that is ignited in the inserted state of the kindling tray in the carrier shell. Thereupon the charcoal chamber is placed on or rather in the kindling tray, where it is secured in accordance with the clamping described above.

In order to position the kindling tray in the best possible way, said kindling tray comprises at least three downwardly projecting support feet, with which said kindling tray stands on the bottom of the carrier shell. Other positioning mechanisms can be implemented.

In order to promote or, more specifically, to ensure suitable air flow, the bottom region of the kindling tray, preferably in the center, is provided with an air inlet for introducing the air coming from the air supply device. The air inlet projects into the kindling tray preferably by means of a flange, an edge or the like, which projects upwards from the bottom region, so that a paste-like kindling aid is effectively prevented from sliding off of said kindling tray in the direction of the air supply device.

The lower region of the housing is provided advantageously with an inner bottom, which may be welded into the housing. The air supply device may comprise an air inlet pipe, which extends from below the inner bottom through the said inner bottom or, integrally formed with said inner bottom, extends through the carrier shell and through the bottom of the kindling aid into the region of the kindling aid. The carrier shell and the kindling tray may be slid or placed on the air inlet pipe, so that the air inlet pipe is used simultaneously to clearly position the carrier shell and the kindling tray.

A fan or, more specifically, a blower can be arranged below the inner bottom, near the inlet of the air inlet pipe. The fan blows air in a controlled manner into the air inlet pipe, as required or rather as a function of the setting.

The fan is a miniaturized unit with extremely low power consumption, similar or identical to the fan in the housing of a computer. In addition, the fan runs almost noiselessly.

A control unit for operating the fan is provided in a particularly advantageous manner. This control unit regulates the fan down on reaching an operating temperature that is detectable preferably above the grill grate.

A switch, a controller and a battery compartment with at least one battery or an accumulator for supplying power to the blower may be disposed below the inner bottom of the housing. The switch and the controller are located advantageously in the wall of the housing, in order to actuate from the outside. The battery compartment is accessible from outside the housing, preferably from below the housing, through a flap that is provided there.

In order to support the air flow over the kindling tray into the charcoal chamber, the housing has openings in the region beneath the inner bottom. These openings, which are used to feed in air, are preferably in the form of decorative passages, for example, in the form of slot-like openings. When the fan is suitably positioned, air is drawn in from outside the housing and blown into the air inlet or, more specifically, into the air inlet pipe up into the charcoal chamber. The air inlet may be part of or, more specifically, an integrated component of the fan housing.

It is also conceivable that the housing has openings in the region above the inner bottom; and these openings, which are used for cooling in the region between the housing and the carrier shell, are preferably in the form of decorative passages or, more specifically, slots over the entire circumference of the housing, so that the outer wall of the housing is temperature-decoupled as far as possible from the charcoal chamber, i.e., on the one hand, due to the interpositioning of the carrier shell, which reflects the heat from inside, and, on the other hand, due to the air space between the carrier shell and the housing. It is also conceivable that the inner bottom is designed so as to be perforated, slotted or otherwise continuous, so that air can also be drawn or blown by means of the fan into the region between the carrier shell and the housing and can flow from the interspace into the region under the inner bottom and from there through the air inlet pipe into the charcoal chamber. This measure also supports the cooling and, thus, an undesired heat transfer to the housing.

With respect to the grill grate and, in particular, with respect to its secure positioning, it is advantageous if said grill grate has plug-in feet, which are used for plugging into openings in the upper edge of the carrier shell or in the housing, so that a secure attachment of the grill grate on the housing is possible. The grill grate itself may have a circumferential guard rail in its edge region, at least slightly above the actual grill area, so that this measure effectively prevents the grilled food from falling off. Thus, another safety measure is provided.

With respect to securing the grill grate in position, it is advantageous if said grill grate can be secured in such a way that it is clamped on the edge of the housing, preferably by means of clamping means, which are preferably made of metal. The clamping means may be clamps or the like, so that it is possible to secure the grill grate in position. As already stated above, when clamping the grill grate, it has a clamping effect on the lid of the charcoal chamber, so that the charcoal chamber is effectively secured between the carrier shell and the grill grate.

In an additional advantageous manner the grill grate has a central closed, preferably corrugated grill area. This grill area in turn can have an outwards sloping drip edge or at least a drip nose, the diameter of which is at least slightly larger than the diameter of the charcoal chamber. In the end, when the grill area is arranged centrally on or rather in the grill grate, the closed grill area will project beyond the charcoal chamber, which is also arranged centrally below said grill grate, so that this measure prevents at least as far as possible the grease from dripping onto the lid of the charcoal chamber. As a result, the dripping grease will fall on the sides next to the charcoal chamber and can run together in the carrier shell.

In order to support the collecting of the dripping grease, the carrier shell is suspended in the housing preferably with an edge region that is at least partially circumferential. In this case the bottom region of the carrier shell slopes down to an outer edge region, where it forms a collecting region for dripping grease. When the carrier shell is made of a high-grade steel, the carrier shell can be easily removed from the housing and can be cleaned, as well as the other components of the grill, in a dishwasher.

Even the housing may be made primarily of metal, where in this case the bottom region beneath the inner bottom may also be easily made of plastic. Both regions can be pressed together, bolted, glued or joined together in some other way.

It is also possible to surface finish the metallic housing at least on the outside by means of powder coating or, more specifically, with a powder coated paint finish. Any color scheme is conceivable.

Furthermore, it is advantageous to make the carrier shell and/or the charcoal chamber (in total) and/or the kindling tray and/or the grill grate of a high-grade steel, in order to achieve, in particular, a long service life and for the purpose of easy cleaning, if possible, in a dishwasher.

Finally it is explicitly pointed out that the above described embodiments of the inventive grill serve merely to elucidate the claimed teaching, but do not limit this teaching to the exemplary embodiments.

LIST OF REFERENCE NUMERALS

1 housing
2 carrier shell
3 grill grate
4 inner bottom (of the housing)
5 rotary knob (of the switch/controller)
6 lower passage (in the wall of the housing)
7 upper passage (in the wall of the housing)
8 edge region (of the carrier shell)
9 clamping device (for clamping the grill grate on the housing)

10 recess in the upper edge region of the carrier shell for inserting the feet of the grill grate
11 foot on the grill grate
12 fastening bracket on the grill grate
13 guard rail on the grill grate
14 grill area, in the center of the grill grate
15 bottom (lower bottom of the housing)
16 opening flap in the bottom of the housing
17 batteries in the battery compartment
18 fan
19 fan housing
20 charcoal chamber
21 flanged lower edge region of the charcoal chamber
22 upper reinforced edge region of the charcoal chamber
23 wall of the charcoal chamber, wall
24 lid of the charcoal chamber
25 group of holes in the lid
26 sloping, oblique surface on the lid
27 handle on the lid
28 foot of the housing
29 battery compartment in the bottom of the housing
30 controller
31 air inlet pipe
32 kindling tray
33 foot of the kindling tray
34 bottom of the charcoal chamber
35 group of holes in the bottom of the charcoal chamber
36 perforation in the wall of the charcoal chamber
37 wall element (for forming the wall)
38 gap (between the wall elements)

The invention claimed is:

1. A grill comprising:
a housing (1) having an inner bottom (4);
a carrier shell (2) having a bottom region containing a passage, the carrier shell (2) being arranged inside the housing (1) at a distance from the housing (1) on all sides;
an essentially cylindrical charcoal chamber (20) located in the carrier shell (2), and having a lid (24) and a cylindrical wall (23);
an air inlet pipe (31) extending through the inner bottom (4) of the housing (1), through the passage of the carrier shell (2), and into a space immediately below the charcoal chamber (20) in the carrier shell (2);
a grill grate arranged above the charcoal chamber (20); and
a fan (18) located within the housing (1) and that generates air flow, which is directed, via the air inlet pipe (31), from below the carrier shell (2) and into a space immediately below the charcoal chamber (20),
wherein:
the cylindrical wall (23) of the charcoal chamber (20) is made of a high-grade steel plate,
the high-grade steel plate is either slotted or perforated,
slots or holes in the high-grade steel plate are sized with a slot width or a hole diameter configured to both enable optimum radiation of heat and prevent embers and sparks from passing through the slots or holes to an external environment, and
the slot width or the hole diameter are in a range of 1 mm to 3 mm.

2. The grill as claimed in claim 1, wherein the wall (23) is a perforated plate.

3. The grill as claimed in claim 2, wherein the perforated plate has a round perforation (36).

4. The grill as claimed in claim 2, wherein the perforated plate has an oval perforation (36).

5. The grill as claimed in claim 2, wherein the perforated plate has an elliptical or elongated perforation (36).

6. The grill as claimed in claim 2, wherein the perforated plate has a rectangular perforation (36).

7. The grill as claimed in claim 2, wherein the perforated plate has a square perforation (36).

8. The grill as claimed in claim 2, wherein the perforations (36) of the adjacent rows of holes lie on a horizontal line.

9. The grill as claimed in claim 2, wherein the perforations (36) of the adjacent rows of holes are arranged so as to be offset from each other.

10. The grill as claimed in claim 2, wherein the holes have a diameter of approximately 2 mm.

11. The grill as claimed in claim 1, wherein the wall (23) has axially extending slots, which are formed parallel to each other and which extend between a continuous bottom-sided edge and a continuous lid-sided edge.

12. The grill as claimed in claim 1, wherein the wall comprises wall elements (37), which are radially offset from each other, at least slightly overlap each other, and in each case form between each other respective axially extending slots.

13. The grill as claimed in claim 1, wherein the slots have a width of approximately 2 mm.

14. The grill as claimed in claim 1, wherein the wall (23) is made of expanded metal.

15. The grill as claimed in claim 1, wherein the lid (24) is perforated in its surface.

16. The grill as claimed in claim 1, wherein inside the charcoal chamber (20) a screen-like inlet made of a fine mesh high-grade steel is arranged, the screen-like inlet being at least one of located further in the carrier shell (2) or connected to the charcoal chamber (20).

17. The grill as claimed in claim 1, wherein at least one of:
the air inlet pipe is integrally formed with the inner bottom (4); or
the space immediately below the charcoal chamber (20) is defined, in part, by a kindling tray (32).

18. The grill as claimed in claim 1, wherein the passage in the carrier shell (2) is a centrally located passage.

19. The grill as claimed in claim 1, wherein the carrier shell (2) further comprises an edge region (21) in direct contact with a corresponding portion of the housing (1).

20. The grill as claimed in claim 1, wherein the housing (1) further comprises an outer bottom (15), a first set of passages in fluid communication with a first space between the inner bottom (4) and the outer bottom (15), and a second set of passages in fluid communication with a second space between the carrier shell (2) and the inner bottom (4) of the housing (1).

* * * * *